Figure 1:
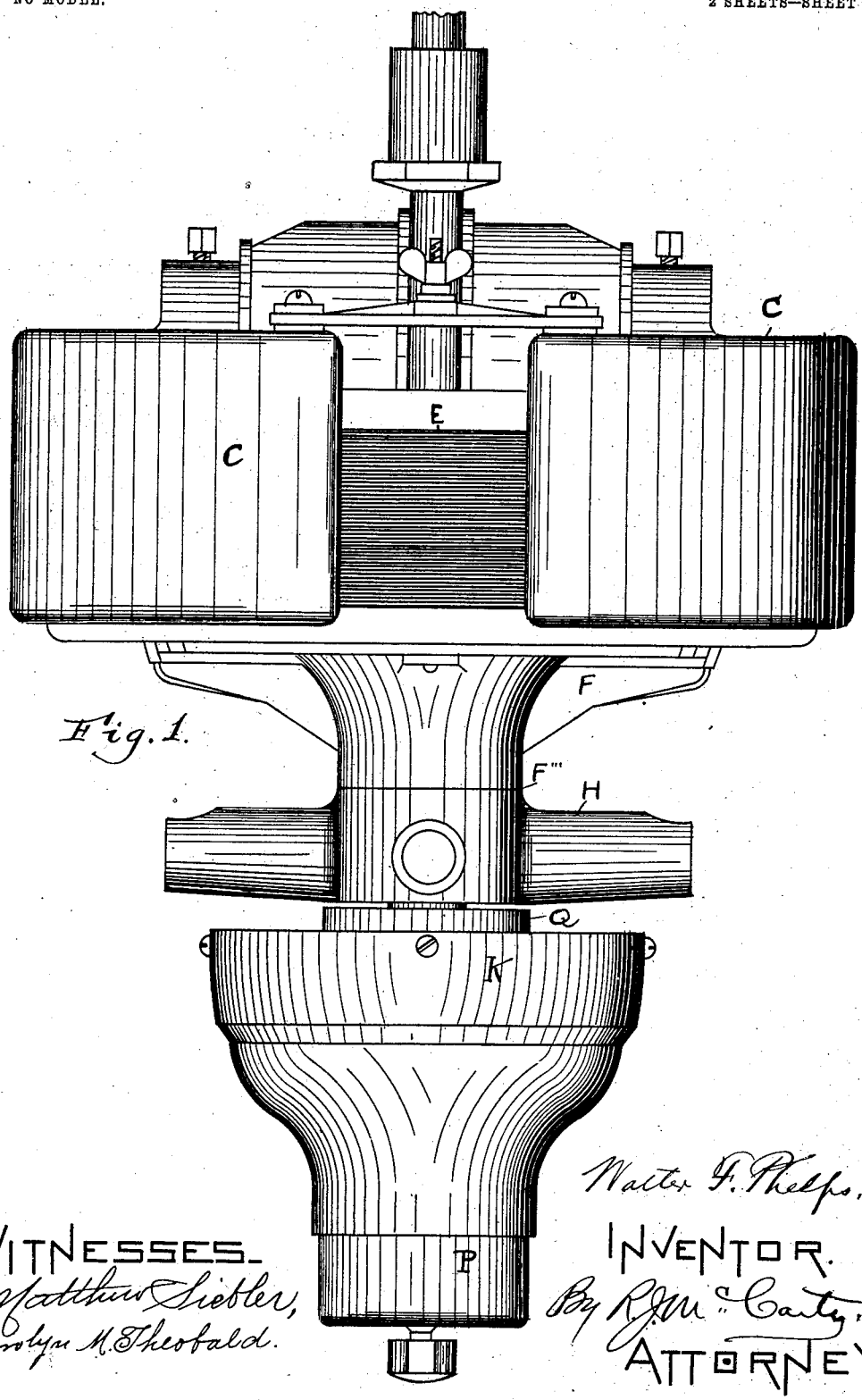

No. 724,498. PATENTED APR. 7, 1903.
W. F. PHELPS.
ELECTRICAL MOTOR FOR CEILING FANS.
APPLICATION FILED FEB. 2, 1903.
NO MODEL. 2 SHEETS—SHEET 1.

WITNESSES
Matthew Siebler,
Carolyn M. Theobald.

INVENTOR
Walter F. Phelps,
By R. J. M. Carty,
ATTORNEY.

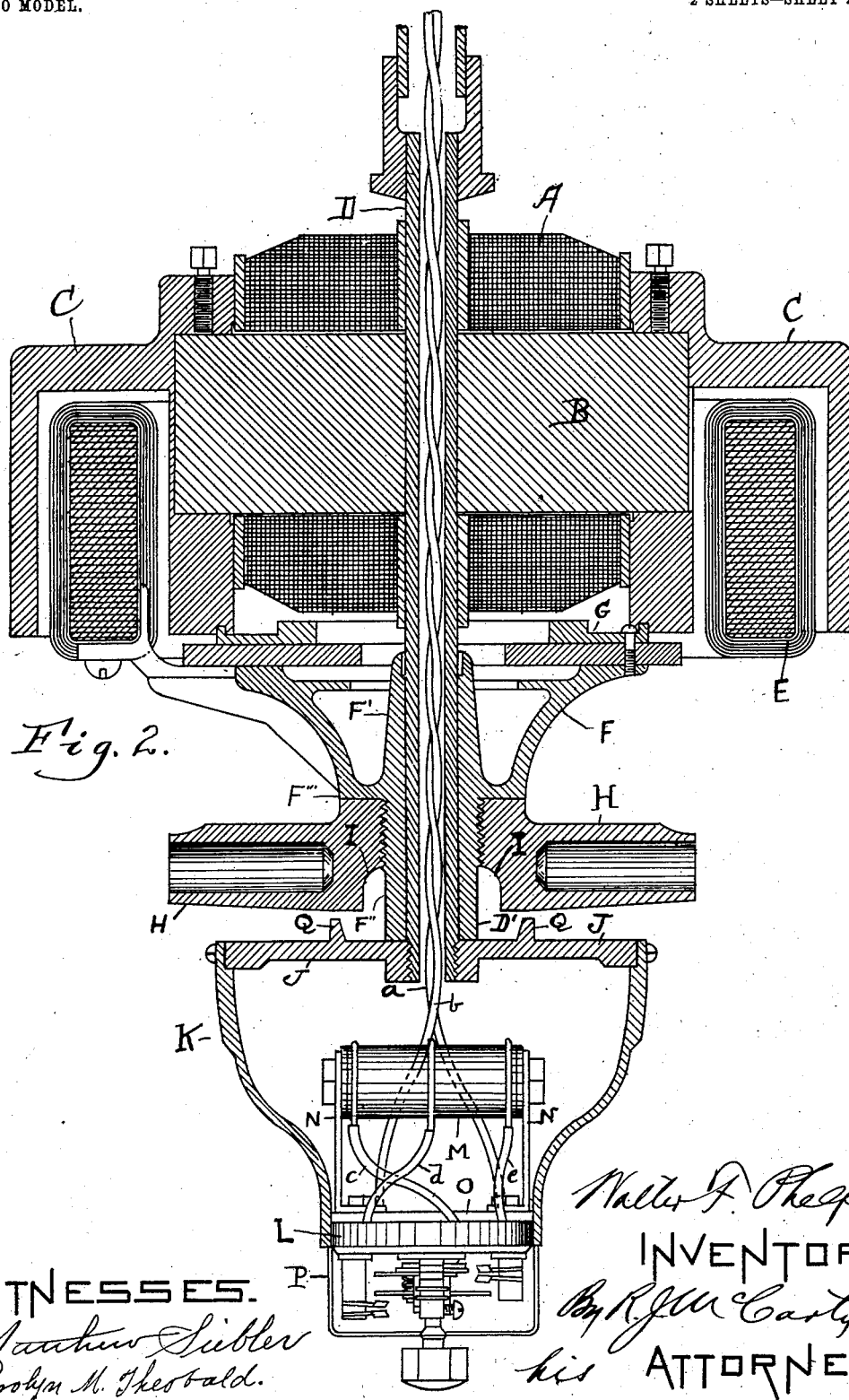

UNITED STATES PATENT OFFICE.

WALTER F. PHELPS, OF DAYTON, OHIO.

ELECTRICAL MOTOR FOR CEILING-FANS.

SPECIFICATION forming part of Letters Patent No. 724,498, dated April 7, 1903.

Application filed February 2, 1903. Serial No. 141,509. (No model.)

*To all whom it may concern:*

Be it known that I, WALTER F. PHELPS, a citizen of the United States, residing at Dayton, in the county of Montgomery and State of Ohio, have invented certain new and useful Improvements in Electrical Motors for Ceiling-Fans; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in electrical motors of the type designed for driving ceiling-fans, and relates specifically to means for placing the switch mechanism and the resistance devices adjacent to each other and below the moving parts of the motor.

The most common trouble experienced with motors of this type is confined to the resistance-coil or rheostat, which heretofore has been located above the motor, rendering the same difficult in assembling and in making the necessary repairs.

The object of the present invention is therefore to locate the controlling mechanism, consisting of the switch mechanism and the resistance devices, below the movable parts of the motor, thereby rendering said controlling devices easily detachable from the motor without necessitating the removal of other parts. The location or assembling of the controlling devices enables the number of wires or conductors passing through the tubular shaft to be reduced, thereby enabling a smaller size of tubular shaft and a more limited amount of wire to be used. Heretofore it has been the practice to locate the switch mechanism below the movable parts of the motor and the rheostat above the movable parts of said motor, and the objection to this has been indicated above.

Preceding a detail description of the invention reference is made to the accompanying drawings, of which—

Figure 1 is a vertical elevation of a ceiling-fan motor having my improvements applied thereto. Fig. 2 is a vertical mid-sectional elevation of the same.

In a detail description of the invention similar reference characters indicate corresponding parts.

A designates a field-magnet winding, B the field-magnet core, and C the polar projections, all of which are upon a tubular motor-shaft D.

E designates an arch supported upon a revolving carrier or basket F, loose upon the lower portion of the shaft D. The said carrier F has a hub which projects upwardly and downwardly, as indicated by F' and F''. Above the lower projecting portion F'' the carrier terminates in an annular shoulder F'''. The commutator G and the fan-blade holder H are also supported upon said carrier. The portion of the hub of the carrier immediately below the shoulder is provided with exterior screw-threads that enable an attachment of the fan-blade holder, the said holder being screwed against the shoulder and a substantial portion of the hub F'' being projected downwardly beyond the point of attachment of the fan-blade holder. The lower portion of said fan-blade holder is cut out to form an annular wall I, which prevents the oil from being thrown out by the action of centrifugal force.

From the above description it will be seen that the movable parts of the motor comprise the carrier F, the armature, the commutator, and the fan-blade holder, all of which, as before stated, are supported upon said carrier. The extreme lower end of the tubular shaft D projects below the extreme lower end of the hub of the carrier and is screw-threaded on its exterior surface to receive a disk or member J, which is rigidly connected therewith and has a threefold function—namely, to provide an oil-cup, to support the revolving carrier, the lower end of the hub thereof resting upon said disk, and to support a depending shell or housing K, which is attachable thereto in any suitable manner. The said shell, it will therefore be seen, is depended from the lower extremity of the tubular shaft by means of this intervening supporting member J, and it will be seen that the said shell may be detached from said member without interfering with any other parts of the motor mechanism. This is a very useful feature in that it enables the controlling mechanisms, consisting of the switch mechanism and the resistance devices, to be supported free from the moving parts of the motor, and it enables the switch mechanism and the rheostat or resistance devices to be placed adjacent to each other and detachable together from a stationary portion of the motor, thereby greatly facilitating the work of assembling and repairs. As before stated, the shell K contains the controlling devices, consisting of a switch L, constructed of the usual material, and with which conductors *a* and *b* are connected, one of said conductors leading from the source of electrical supply and the other of said conductors being the return-wire from the switch.

M designates a rheostat or resistance-coil which is mounted within the shell K adjacent to the switch by means of arms N, supported on a bridge-piece O, extending across the lower portion of the shell above the switch. The said rheostat is connected with the switch-points by three conductors *c d e* and enables three speeds to be transmitted to the motor—to wit, when all the resistance is thrown in, when half of the resistance is thrown in, and when the resistance is all thrown out. The conductor *e* connects with the contact-point on the switch which receives the terminal of the supply-wire. The moving contact-points, the binding-posts, and the other switch mechanism are inclosed in a casing P, which is secured to the lower extremity of the shell or housing K. It will thus be seen that the switch mechanism and resistance devices are in close relation with each other and are removable with the detachment of the inclosing shell K. The upper side of the disk or member J is provided with an annular rim Q, which provides an oil-cup. The annular wall I in the fan-blade holder, as hereinbefore referred to, is immediately above the oil-chamber, as will be seen from Fig. 2. This wall returns the oil to the cup.

Having described my invention, I claim—

1. In a ceiling-fan motor, the combination with a motor having a tubular shaft, a carrier inclosing said shaft, a revolving fan-blade holder moving with said carrier, and switch mechanism and resistance devices mounted upon a stationary part of the motor below the moving parts of said motor, substantially as set forth.

2. In a ceiling-fan motor, the combination with a tubular shaft, of a carrier, a fan-blade holder secured to said carrier, a stationary member below the fan-blade holder, switch mechanism and resistance devices depended from said stationary member below the movable parts of the motor, substantially as set forth.

3. In a ceiling-fan motor, the combination with a motor having a stationary tubular shaft, of a carrier inclosing said shaft, a fan-blade holder supported upon and movable with said carrier, a disk or member secured to the tubular shaft and supporting the carrier, switch mechanism and resistance devices mounted below the movable parts of the motor, and an inclosing shell in which said switch and resistance devices are supported, said shell being detachable from the disk or member, substantially as set forth.

4. In a ceiling-fan motor, a motor-shaft, two conductors passing through said motor-shaft, a switch to which said conductors are connected, and a rheostat adjacent to said switch, said rheostat and switch being mounted below the moving parts of the motor, substantially as set forth.

5. In a ceiling-fan motor, the combination with a motor having a stationary shaft, a carrier revolving on said shaft, a fan-blade holder secured to said carrier, a member secured to the shaft below the fan-blade holder, an oil-cup above said member, switch mechanism and resistance devices located adjacent to each other, and a support for said switch mechanism and resistance devices, said support being depended from said stationary member, substantially as set forth.

6. In a ceiling-fan motor, the combination with a motor having a tubular shaft, a carrier inclosing said shaft, said carrier having hub portions F' and F'', and an annular shoulder F''', a fan-blade holder secured to the lower portion of said hub against the shoulder F''', a disk or member secured to the tubular shaft and supporting the carrier below the fan-blade holder, switch mechanism and resistance devices mounted below the movable parts of the motor, and an inclosing shell in which said mechanism and devices are supported, said shell being supported upon the disk or member, substantially as set forth.

7. In a ceiling-fan motor, the combination with a tubular shaft, of a fan-holder, a stationary member below said fan-holder, switch mechanism and resistance devices depended from said stationary member and occupying a position below the movable parts of the motor.

In testimony whereof I affix my signature in presence of two witnesses.

WALTER F. PHELPS.

Witnesses:
R. J. McCARTY,
E. G. DENLINGER.